Nov. 28, 1939.  M. C. GILLETT ET AL  2,181,480
HEATING SYSTEM
Filed March 11, 1937  3 Sheets-Sheet 2

INVENTORS:
Merriman C. Gillett,
Edward Dret Danberry &
Austin Oliver Roche Jr.
By Pennie, Davis, Marvin & Edmonds
Attorneys

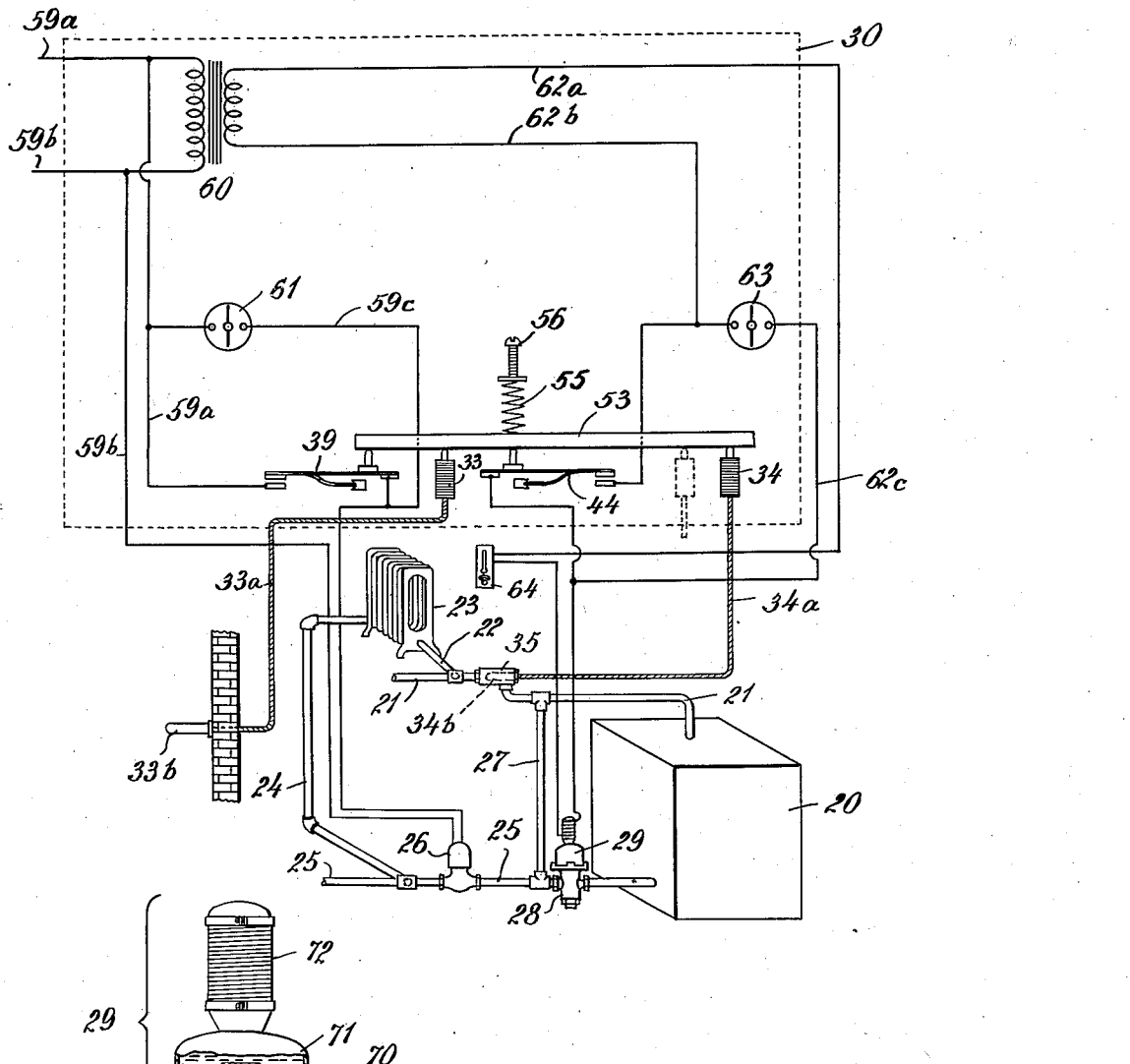
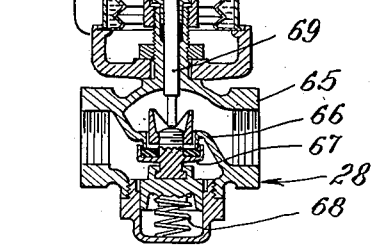

Patented Nov. 28, 1939

2,181,480

UNITED STATES PATENT OFFICE

2,181,480

HEATING SYSTEM

Merriman C. Gillett, Philadelphia, Pa., Edward Nute Sanbern, Rockville Centre, N. Y., and Austin Oliver Roche, Jr., Stamford, Conn., assignors to Hoffman Specialty Company, New York, N. Y., a corporation of Illinois Application March 11, 1937, Serial No. 130,346

9 Claims. (Cl. 236—91)

This invention relates to heating or cooling systems in which a circulating fluid is used as the heating or cooling medium and is concerned more particularly with a novel method of heating or cooling and a new apparatus by which that method can be practiced. A system embodying the principles of the invention and operating in accordance with the new method automatically delivers varying quantities of heat to the space to be treated or removes varying quantities of heat from such space in accordance with varying requirements in demand and thus functions to maintain substantially uniform temperature conditions. Since the new system responds more promptly than prior systems to changes in demand, the temperatures maintained by it vary less from the desired value than those maintained by its predecessors, and the system, therefore, operates more efficiently and economically.

The method and apparatus of the invention preferably employ hot or cold water as the temperature regulating medium, although other circulating media may be employed, and utilize any suitable source of heat or cold, such as a boiler of conventional construction fired with solid, liquid, or gaseous fuel or a suitably cooled brine tank. The invention may be applied for various purposes, but since the principles involved may be readily explained as embodied in a hot water house heating system, apparatus adapted for that purpose and operating in accordance with the new method will be illustrated and described in detail. It is to be understood, however, that the utility of the invention is not limited to this specific embodiment and the adaptation of the invention for other purposes and in other forms will be readily apparent.

A system constructed and operating in accordance with the principle of the present invention differs from prior systems inasmuch that it feeds water of the proper temperature to meet outside conditions, to the radiators continuously. To make this clear, hotter water is supplied to the radiators when it is 0° F. outside than if the temperature should be only 50° F. It can be seen that in a hot water heating system constructed on this principle there is no over running of inside temperature because the radiators are always being supplied with water of the proper temperature to balance the heat loss. It can be seen also that the use of different kinds of radiators (cast iron, convectors, etc.) will not introduce any difficulties in this system as has been the case in the older systems.

In order to accomplish this, water is continuously circulated through the supply piping, radiators, return piping and a by-pass around the boiler, the boiler supplying only enough heated water to keep this circulating stream at the proper temperature. This hot boiler water is replaced by an equal amount of cooler water from the returns by a control valve. The new apparatus includes a by-pass around the boiler connecting the supply and return mains, a pump which circulates water continuously through the radiators, supply and return piping and by-pass. a control valve for controlling the amount of return water permitted to enter the boiler and force hot water into the supply stream, and temperature sensitive means acting between the outdoor temperature and the supply water temperature for manipulating the control valve. The temperature sensitive means responsive to the supply water temperature is acted upon by the supply water on the radiator side of the point where hot water from the boiler mixes with cooler return water from the by-pass.

To make the system entirely automatic a device is embodied in the outside temperature sensitive element which will shut off the circulating pump. and therefore the heating system, when an outside temperature is reached which would make heating unnecessary. Obviously this same automatic mechanism again turns on the circulator when heating becomes necessary. Switches may be provided for manually operating the circulator or the control valve for testing purposes if it is deemed necessary.

For a better understanding of the invention, reference may be had to the accompanying drawings in which there is illustrated a heating system constructed and operating in accordance with the principles of the invention. In these drawings Figure 1 is an elevation of the valve control apparatus of the new heating system;

Figures 2, 3 and 4 are sectional views of the apparatus of Figure 1 taken along lines 2—2, 3—3, and 4—4 respectively;

Figure 7 is a diagrammatic view of the entire system, including the controls; and Figure 8 is a vertical section through the control valve and its operating motor.

Figure 1:
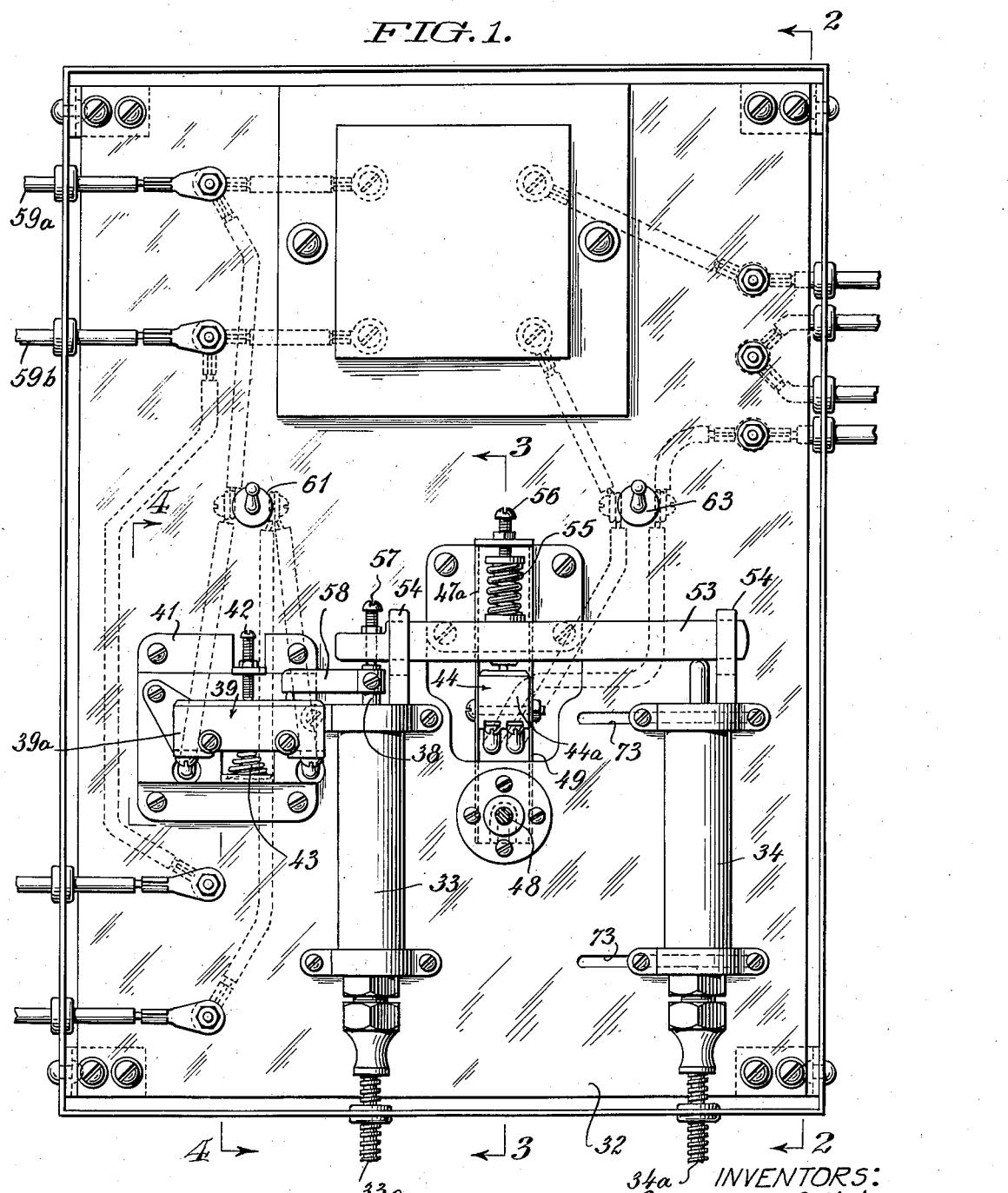
Figure 2:
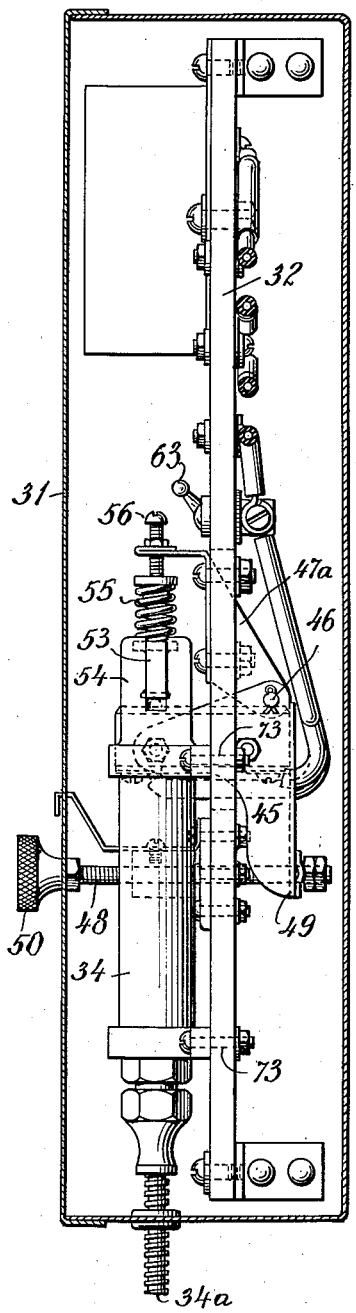
Figure 3:
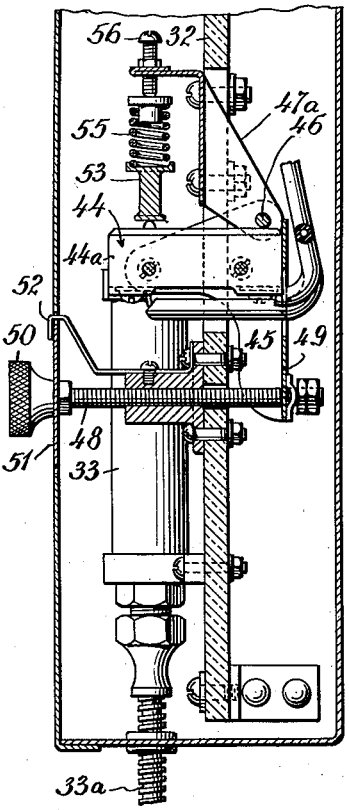
Figure 4:
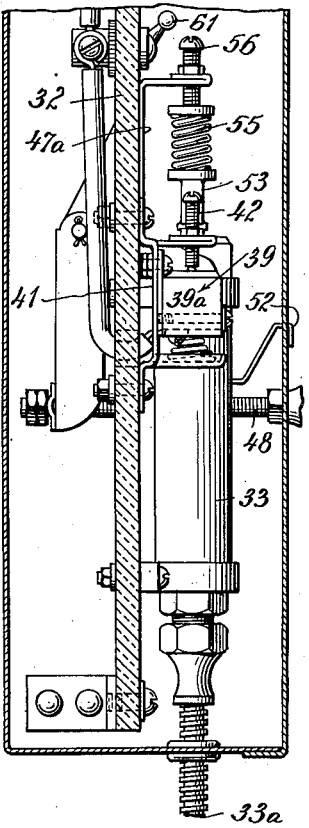

The system illustrated is of the direct two-pipe low return type, but it is to be understood that the invention may be utilized equally well in systems of other types. The system shown includes a boiler 20 heated in the usual way, as for example, by the combustion of solid fuel on a grate or by gaseous or liquid fuel delivered into the furnace chamber by a burner of any suitable construction, and the operation of the boiler may be controlled manually or by any of the ordinary automatic devices ordinarily used for the purpose. The temperature of the water in the boiler must be kept high enough to meet the maximum conditions for which the radiation was designed.

A supply main 21 leads from the top of the boiler and is connected by branches 22 to radiators 23 (only one being shown) each of which is connected by a return branch 24 to a return main 25 which leads to the bottom of the boiler. In the return main is a motor driven circulating pump 26 of any suitable construction. Between the circulating pump and the boiler, the return main 25 is connected to the supply main 21 by a by-pass connection 27, and between the by-pass 27 and the boiler is a control valve 28, actuated by an electric motor 29. The operation of both the circulating pump and the control valve is controlled by a control apparatus generally designated 30 which responds to variations in demand and for this purpose may be responsive to the temperature of the water in the supply main and also to variations in the temperature outside the building. The device may take various forms; the apparatus illustrated has been found to be satisfactory for the purpose.

Figure 5:
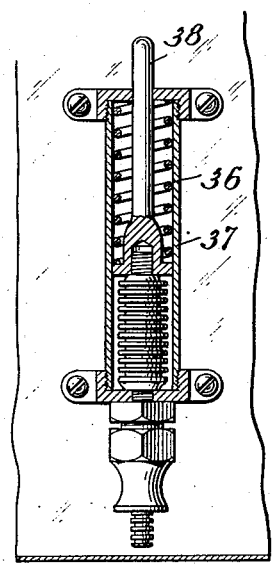
Figure 5 is a vertical section through one of the bellows housings shown in the preceding figures.

This control apparatus includes a housing generally designated 31 enclosing a panel 32 on which are mounted the various devices which we shall now describe, referring to Figure 7 for the general arrangement and to the other figures for details. Mounted on the panel are two bellows 33 and 34 from which lead tubes 33a and 34a terminating in bulbs 33b and 34b, bellows, tubes and bulbs containing heat-expansible fluid. Bulb 33b is mounted outside the building in a position to be exposed to the outside temperature; bulb 34b is mounted in a fitting 35 in the supply main 21 so that the fluid is heated by the water in the main. The fitting 35 is placed beyond the point where hot water from the boiler mixes with cooler water from the by-pass, thus the supply water which acts upon bulb 34b is of uniform temperature. Each of the bellows is fixed at its lower end, its upper end being free to move as the bellows expands, but against the pressure of a coil spring 36 (see Figure 5) housed with the bellows within a cylinder 37. Fixed to and movable with the free end of each bellows is a rod 38 extending beyond the end of its cylindrical housing 37.

Figure 6:
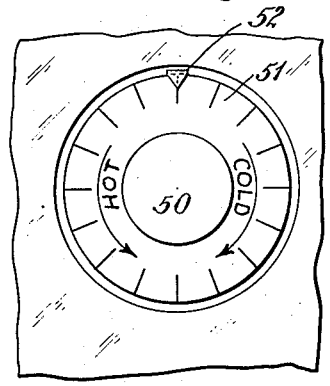
Figure 6 is a detail of the indicator dial used for adjusting the automatic control for the by-pass valve.

To the left of the bellows 33 is a switch 39 in a casing 39a adjustably mounted in a bracket 41 between a set-screw 42 and a coil spring 43. A similar switch 44 is mounted in a casing 44a located between the two bellows on a support 45 pivoted at 46 to the rearwardly extending arms 47a of a bracket 47. The position of the support 45 is adjusted by a screw 48 threadedly mounted in the panel, the inner end of the screw being secured to a depending arm 49 of the bracket 45, the outer end terminating in a knurled head 50. A dial 51 illustrated in Figure 6, is fixed to the screw 48 behind the knurled head 50 and registers with a fixed pointer 52.

Extending across the bellows 33 and 34 and the switch 44 is a lever 53 vertically movable in guides 54 and held in engagement with the ends of the rods 38 and with the movable contact of switch 44 by means of a coil spring 55 placed between the lever and a set-screw 56 mounted in the bracket 47. As shown in Figure 1, the left hand end of lever 53 engages the upper end of rod 38 of bellows 33 through a set-screw 57. An arm 58, clamped to the upper end of this rod 38, extends to the left and engages the movable contact of switch 39.

The switch 39 is in series with the motor of the circulating pump 26 through power lines 59a and 59b, and in parallel with the primary of a transformer 60. By means of a shunt 59c including a manual switch 61, the switch 39 can be cut out of effective operation. The switch 44 is in series with the motor 29, and the secondary of the transformer 60 through lines 62a and 62b, this circuit likewise being provided with a shunt 62c including a manual switch 63 by which the switch 44 can be cut out of effective operation. A thermostatically controlled switch 64 is in series with the switch 44 and motor 29 when switch 63 is open and in series with the motor when that switch is closed. This switch 64 opens when the temperature in the room reaches a predetermined maximum, whether switch 63 is open or closed.

The switch 39 is adjusted to remain closed at all times when the outside temperature is below, say 65° F., and to open when the outside temperature reaches or exceeds this temperature. Thus the circulating pump is in continuous operation during cold weather when heating is required but is automatically stopped when the outside temperature moderates. The temperature at which switch 39 is operated by the arm 58 may be regulated by adjusting the position of the switch through set-screw 42.

In the operation of the control apparatus a decrease in the outside temperature causes a contraction of the bellows 33 which permits the lever 53 to be swung downward about its right hand end as a fulcrum thus closing the circuit to the motor 29 through switch 44 and opening valve 28. This permits high temperature water from the boiler to enter and mix with the water of the supply main thus supplying hotter water to the radiators. This increase in the temperature of the supply water causes the fluid in bulb 34b, tubing 34a and bellows 34 to expand and force up the end of lever 53. The lever rocks about the screw 57 as a fulcrum causing switch 44 to open and thus shut off control motor 29 and close the valve 28. A drop in the temperature of the supply water will cause the bellows 34 to contract lowering lever 53 around the screw 57 as a fulcrum and thus permit the switch 44 to close, thereby permitting motor 29 to open valve 28. This permits the discharge of cool return water into the boiler and simultaneously the addition of an equal quantity of hot water to the supply main.

It can be seen, therefore, that for any drop of outdoor temperature or supply water temperature the lever 53 closes switch 44, thus opening the control valve. For any increase in both or either of these temperatures a reverse action takes place. Should the condition arise in which one of the temperatures falls while the other one rises the apparatus will totalize the movement at the switch point and the vectorial resultant will determine whether the switch will open or close.

The control valve 28 and its motor 29 may be of any suitable construction, but a valve actuated by a heat motor has given satisfaction and that construction is illustrated in Figure 8. As there shown, the valve includes a body 65 which contains a partition provided with a valve seat 66 with which cooperates a valve disc 67 biased toward closing position by a spring 68. A stem 69 bears at one end against the disc and at the other end against the inner surface of the end wall of a bellows 70 mounted within a casing 71, within which, but outside the bellows, is an expansible fluid. Mounted on the end of the casing is a heating coil 72 in circuit with the switch 44, as previously explained. When the switch is closed by the control apparatus, current is supplied to the coil 72 and the heat developed by the coil causes an expansion of the fluid. This in turn causes the bellows 70 to collapse and the stem 69 is thereby moved lengthwise to force the valve disc 67 off its seat. When the circuit through the coil 72 is opened, the fluid contracts and the valve disc 67 is seated by the spring 68.

For adjusting to different inside temperatures the distance of switch 44 below lever 53 can be varied by turning the knurled head 50 of screw 48 as previously explained. To change the relationship between outdoor and supply water temperatures to meet the conditions of different localities, the ratio of the lever arms represented by the distance of switch 44 from fulcrum 57 and bellows 34 from fulcrum 57 must be changed. In Figure 1 this can be done by moving bellows 34 and its housing along slots 73. It is realized that this same adjustment could be brought about by permitting bellows 34 to remain stationary and moving switch 54 but for the sake of illustration only the former is shown in the figure.

The operation of the system under different conditions is as follows: As long as the water in the supply main is of the proper temperature to meet the outdoor temperature conditions the circulating pump 26 causes water to flow only through supply main 21, branch 22, radiators 23, branch 24, return main 25 and by-pass 27. This condition obtains under the same outdoor temperature until the temperature of the supply falls a small amount below that required. When this happens bellows 34 contracts letting the lever 53 drop down and close switch 44 which opens the control valve 28 through motor 29, thus permitting some of the return water to be directed into the boiler which forces out an equal amount of hot water and permits it to mix with the water returned through by-pass 27 until the proper temperature is established in the supply main 21 whereupon the liquid in bulb 34b is heated causing bellows 34 to expand thus raising lever 53 and permitting switch 44 to open which in turn shuts off motor 29, thus permitting valve 28 to close and the circulation of the stream is again as described above for the correct supply water temperature. The same action will occur on a drop in the outdoor temperature through the contraction of bellows 33.

Although not absolutely necessary, instead of going from switch 44 to motor 29 directly the circuit can be lead through thermostatic switch 64. In that case this thermostatic switch will act as a maximum control element, in which case the control valve can not add hot boiler water to increase the supply water temperature if the room is above a predetermined temperature. Thermostatic switch 64 is not considered absolutely necessary since the same can be accomplished by adjusting knob 50 of screw 48.

We claim:

1. A method of heating a space by means of a fluid medium, which comprises positively circulating through the space, as long as the temperature external to said space remains below a predetermined point, a substantially constant quantity of said medium at a temperature sufficient to cause the medium to deliver heat to the space at the desired rate, maintaining a reservoir of heat in the form of a quantity of said medium at a higher temperature than that of the circulating medium, and maintaining the circulating medium at the desired temperature by replacing a portion thereof with medium withdrawn from said reservoir.

2. A method of heating a space by means of a fluid medium which comprises positively circulating through the space a substantially constant quantity of said medium at a temperature sufficient to cause the medium to deliver heat to the space at the desired rate, said medium being circulated mechanically at a speed in excess of that produced by gravity action, maintaining a reservoir of heat in the form of a quantity of said medium at a higher temperature than that of said circulating medium, maintaining the circulating medium at the desired temperature by replacing a portion thereof with medium withdrawn from said reservoir and delivering said replaced portion to the reservoir, stopping the positive circulation of the medium when the temperature of the outside atmosphere rises above a predetermined point and resuming such circulation when the outside temperature drops below that point.

3. Apparatus for heating a space which comprises a heater, a reservoir of heating medium heated by said heater, a circulating system connected to said reservoir and including supply and return piping, and a radiator in said space connected to the piping, pump means for forcing the medium through the system and reservoir, temperature-responsive means for throwing the pump means out of operation when the temperature of the outside atmosphere rises above a predetermined point, and into operation when that temperature drops below that point, manually controlled means for rendering said temperature-responsive means inoperative, thereby maintaining the pump in continuous operation, a by-pass connecting the supply and return piping around said reservoir, and a valve for regulating the relative amounts of fluid flowing, respectively, through the reservoir and through the by-pass.

4. A thermostatic control means for a temperature regulating system employing a circulating medium, comprising a switch, switch-controlled means for regulating the temperature of the medium, a lever for operating the switch, thermostatic expansion elements, one responsive to outside temperatures and one responsive to the temperature of the medium, acting differentially on the lever, to control said switch-controlled means and a second switch controlled means operated by the first expansion element for regulating the rate at which the medium is circulated.

5. In an apparatus for controlling the temperature of a space comprising a reservoir of heat transferring medium, a circulating system connected to said reservoir, a pump for positively circulating the medium through the system, and a valve for regulating the amount of the medium fed from the reservoir to the circulation system, the combination of a lever, a plurality of temperature-responsive elements acting upon said lever to move it differentially in accordance with the outside temperatures and the temperature of the medium to control the valve, and means actuated by said outside temperature-responsive element to control the pump.

6. In an apparatus for heating a space comprising a reservoir of heating medium, a circulating system connected to said reservoir, a pump for positively circulating the medium through the system, and a valve for regulating the amount of the medium circulated, the combination of a lever, a plurality of temperature-responsive elements acting upon said lever to move it differentially in accordance with the outside temperatures and the temperature of the medium to control the valve, and means actuated by said outside temperature-responsive element to control the pump.

7. Apparatus for heating a space comprising a reservoir of heating medium, a circulating system connected to the reservoir and including supply and return piping and a radiator in the space to be heated connected to the piping, a pump for continuously circulating the medium through the piping, a by-pass connecting the supply and return piping around the reservoir, a valve for regulating the relative amounts of heating medium flowing, respectively through the reservoir and through the by-pass, means responsive to variations in temperature in the medium in the supply piping beyond the by-pass, means responsive to variations in the outside temperature and means controlled indirectly by both temperature responsive means for opening and closing the valve.

8. Apparatus for heating a space comprising a reservoir of heating medium, a circulating system connected to the reservoir and including supply and return piping and a radiator in the space to be heated connected to the piping, a pump for continuously circulating the medium through the piping, a by-pass connecting the supply and return piping around the reservoir, a valve for regulating the relative amounts of heating medium flowing, respectively through the reservoir and through the by-pass, an electrically operated motor for opening and closing the valve, means responsive to variations in temperature in the medium in the supply piping beyond the by-pass, means responsive to variations in the outside temperature and a switch acted upon by both temperature responsive means for throwing the motor into or out of operation.

9. Apparatus for heating a space combining a reservoir of heating medium, a circulating system connected to the reservoir and including supply and return piping and a radiator in the space to be heated connected to the piping, a pump for continuously circulating the medium at substantially a constant rate through the piping, a by-pass connecting the supply and return piping around the reservoir, a valve in the return line between the by-pass connection and the reservoir which when open provides two paths for the circulating medium, one through the reservoir and one through the by-pass, means responsive to variations in temperature in the medium placed in the supply piping beyond its junction with the by-pass, means responsive to variations in the outside temperature, and means for combining the effect of the two temperature responsive means and operating the control valve in the return line.

MERRIMAN C. GILLETT.
EDWARD NUTE SANBERN.
AUSTIN OLIVER ROCHE, Jr.